US011858268B1

(12) United States Patent
Carrithers et al.

(10) Patent No.: US 11,858,268 B1
(45) Date of Patent: Jan. 2, 2024

(54) EJECTION HEAD PRIMING MECHANISM

(71) Applicant: Funai Electric Co., Ltd., Osaka (JP)

(72) Inventors: Adam D. Carrithers, Lexington, KY (US); Bruce A Deboard, Lexington, KY (US); Raymond Joseph Fortuna, II, Lexington, KY (US); Bruce D. Gibson, Lexington, KY (US); Michael A. Marra, III, Lexington, KY (US); Robert W. Milgate, III, Lexington, KY (US)

(73) Assignee: FUNAI ELECTRIC CO., LTD.

( * ) Notice: Subject to any disclaimer, the term of this patent is extended or adjusted under 35 U.S.C. 154(b) by 0 days.

(21) Appl. No.: 17/809,312

(22) Filed: Jun. 28, 2022

(51) Int. Cl.
*B41J 2/14* (2006.01)
*B41J 2/175* (2006.01)

(52) U.S. Cl.
CPC ........... *B41J 2/14032* (2013.01); *B41J 2/175* (2013.01)

(58) Field of Classification Search
CPC .............................. B41J 2/14032; B41J 2/175
See application file for complete search history.

(56) References Cited

U.S. PATENT DOCUMENTS

| | | | | |
|---|---|---|---|---|
| 5,517,223 | A | 5/1996 | Shin | |
| 6,116,297 | A | 9/2000 | Feygin | |
| 6,491,387 | B1 | 12/2002 | Mayfield | |
| 7,833,487 | B2 | 11/2010 | Sasaki et al. | |
| 8,567,890 | B2 | 10/2013 | Ito et al. | |
| 2005/0073552 | A1 * | 4/2005 | Smoot | B41J 2/14072 347/50 |
| 2008/0030532 | A1 * | 2/2008 | Onoe | B41J 25/001 347/9 |
| 2016/0375686 | A1 * | 12/2016 | Yokoyama | B41J 2/14298 347/70 |

FOREIGN PATENT DOCUMENTS

| | | | | | |
|---|---|---|---|---|---|
| EP | 0661160 | A2 * | 7/1995 | B41J 2/175 |
| JP | 2009051225 | A * | 3/2009 | B41J 2/175 |

* cited by examiner

*Primary Examiner* — Yaovi M Ameh
(74) *Attorney, Agent, or Firm* — Luedeka Neely, P.C.

(57) ABSTRACT

A priming device for a fluid cartridge, a fluid dispense device configured for priming the fluid cartridge, and a method for priming a fluid cartridge. The priming device includes an impact mechanism for a fluid cartridge, wherein the fluid cartridge is devoid of a backpressure device and has a fluid reservoir and an ejection head chip in fluid flow communication with the fluid reservoir.

17 Claims, 8 Drawing Sheets

EJECTION HEAD PRIMING MECHANISM

TECHNICAL FIELD

The disclosure relates to fluid ejection devices and in particular to methods and apparatus for priming ejection head chips for fluid ejection devices.

BACKGROUND AND SUMMARY

In the medical field, in particular, there is a need for automated sample preparation and analysis. The analysis may be colorimetric analysis or require the staining of samples to better observe the samples under a microscope. Such analysis may include drug sample analysis, blood sample analysis and the like. Assay analysis of blood, for example, provides a number of different factors that are used to determine the health of an individual. When there are a large number of patients that require blood sample analysis, the procedures may be extremely time consuming. For assay analysis, such as drug screenings, it is desirable to deposit miniscule amounts of target reagents to a substrate in order to evaluate their effect and performance on the samples. Traditionally, pipettes—manually or electromechanically actuated—are used to deposit trace substances into these assay samples.

In order to increase the speed of analysis and to handle larger quantities of samples, automated fluid dispense systems have been developed. The automated systems often require that small quantities of multiple fluids be dispensed through the use of fluid ejection head chips. Thus, the fluid dispense system capable of rapidly processing large quantities of samples to be analyzed is quite elaborate and expensive.

In an attempt to reduce the cost of the fluid dispense systems, a fluid ejection device 10 has been developed (FIG. 1) that can use the configuration of a conventional ink jet printer device to process samples on glass slides or in wells 12 of a micro-well plate 14 (FIG. 2). The device 10 includes a housing 16 that contains fluid ejection cartridges and a mechanism to move a tray 18 containing slides or a micro-well plate through the housing 16. The fluid ejection cartridges used in the fluid ejection device 10 have an ejector array 20 that is in flow communication with a fluid 22 in a fluid reservoir of the cartridge (FIGS. 3 and 4).

A conventional ink jet printer cartridge includes a backpressure device such as a bladder or a piece of absorbent material such as foam or felt which allows a large quantity of jetting fluid to be stored in the cartridge without the fluid 22 drooling or dripping out of the ejection head chip 40 attached to the cartridge. Due to the nature of the backpressure device, the fluid 22 in a nozzle 24 on the ejector array 20 maintains a concave meniscus 26 with respect to the external face 28 of the ejector array 20 as shown in FIG. 3. Accordingly, it is common practice to prime the ejector array 20 by using a negative pressure to remove air bubbles in the fluid and to pull fluid through the fluidic paths in the ejection head chip. It is also common practice to protect the ink jet printer cartridge from sudden impacts during shipping and handling since impacting the ejection head chip could lead to the ingestion of air bubbles into a fluid cartridge containing a backpressure device.

However, the device 10 for sample analysis uses an end-user fillable fluid cartridge 30 having a cartridge body 32 having one or more empty chambers 34*a*, 34*b* that are devoid of backpressure devices to provide fluid reservoirs for the fluid ejector arrays 20*b* in the fluid ejection head chip

40 attached to the cartridge body 32 (FIGS. 4-5). The end-user fillable fluid cartridge allows researchers to fill the empty chambers 34*a*, 34*b* of the end-user fillable fluid cartridge 30 with a small quantity of a variety of fluids for analytical purposes. As a result, it is impractical and undesirable to apply a negative pressure to prime the ejector arrays 20*a*, 20*b* since a vacuum source may not be available or may cause cross-contamination of the jetting fluids. It is thus necessary to ensure that that ejector array 20 is reliably primed in order to dispense highly precise doses or droplets 37 of a jetting fluid for such analytical purposes as shown in FIG. 6. Depending on the fluid properties, the resistance of the fluid to spontaneous priming of the ejector array 20 and the low volume of fluid in the cartridge 30, there is a need for a reliable priming mechanism for the end-user fillable fluid cartridges 30 used in such fluid ejection devices 10.

In view of the foregoing, embodiments of the disclosure provide a priming device for a fluid cartridge, a fluid dispense device configured for priming the fluid cartridge, and a method for priming a fluid cartridge. In one embodiment, the priming device includes an impact mechanism for a fluid cartridge, wherein the fluid cartridge is devoid of a backpressure device and has a fluid reservoir and an ejection head chip in fluid flow communication with the fluid reservoir.

In some embodiments, the fluid cartridge is an open-top fluid cartridge.

In some embodiments, the impact mechanism is a manually operated impact mechanism. In other embodiments, the impact mechanism is an automated impact mechanism. In still other embodiments, the impact mechanism is an impact rod of an electro-mechanical actuator. In other embodiments, the impact mechanism is an impact head attached to a frame member of a fluid dispense device. In other embodiments, the impact mechanism is a spring biased plunger attached to a fluid cartridge holder.

In some embodiments, the priming device includes an ejection head chip heater. In other embodiments, the ejection head chip heater is disposed on the ejection head chip.

In some embodiments there is provided a fluid dispense device that includes a fluid cartridge devoid of a backpressure device. The fluid cartridge has a fluid reservoir and an ejection head chip in fluid flow communication with the fluid reservoir. A fluid cartridge translation mechanism is provided for moving the fluid cartridge in a first direction across a substrate. An impact head is attached to a frame member of the fluid dispense device and is configured for priming the fluid cartridge.

In some embodiments, there is provided a method for priming a fluid cartridge. The method includes providing a fluid cartridge devoid of a backpressure device, wherein the fluid cartridge has one or more fluid reservoirs and one or more ejection head chips in fluid flow communication with the fluid reservoir. A side wall of the fluid cartridge is impacted with an impact mechanism.

In some embodiments, there is provided method for priming a fluid cartridge. The method includes providing a fluid cartridge devoid of a backpressure device, wherein the fluid cartridge has one or more fluid reservoirs and one or more ejection head chips in fluid flow communication with their respective fluid reservoirs. The fluid cartridge is rapidly accelerated in a direction perpendicular to a plane defined by a nozzle plate of the ejection head chip.

An advantage of the disclosed embodiments, is that the priming mechanisms described herein provide an effective and efficient means of priming an ejection head chip without the use of an elaborate vacuum or suction device, particularly when a fluid cartridge is filled with a minimal amount of fluid. The apparatus and methods enable the use of open-top cartridges and/or cartridges devoid of backpressure devices thereby allowing the use of fluids selected by the user rather than the use of pre-filled fluid cartridges.

DETAILED DESCRIPTION OF EMBODIMENTS

Figure 4:
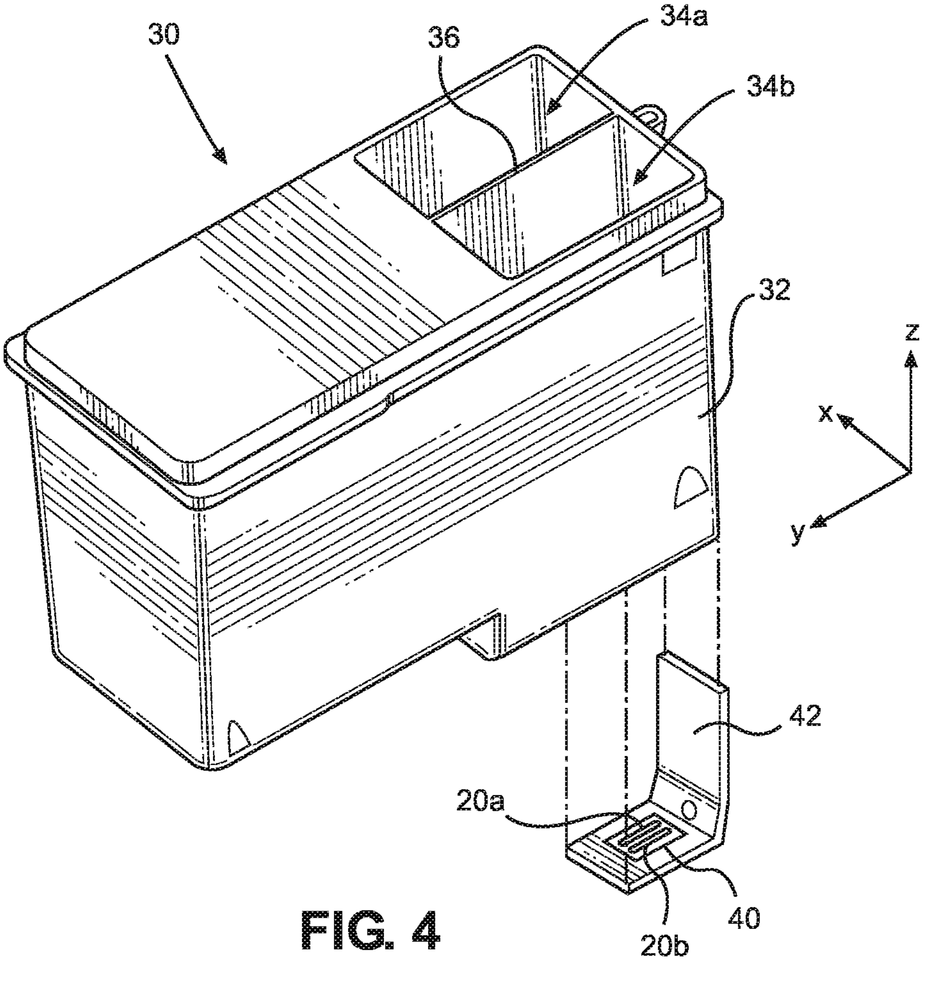
FIG. 4 is a perspective view of an open-top fluid cartridge for use with the fluid dispense device of FIG. 1.
Figure 5:
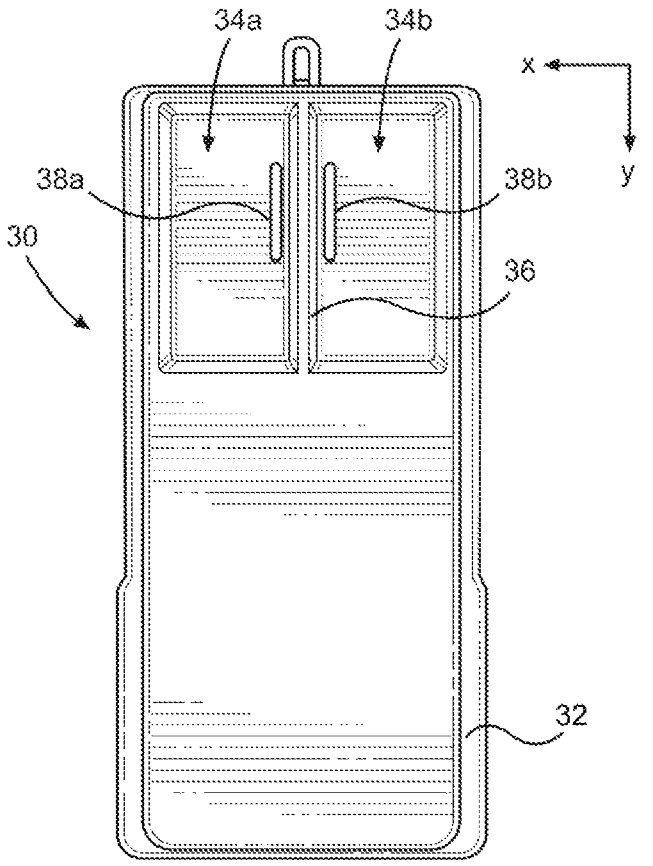
FIG. 5 is a top plan view of the open-top fluid cartridge of FIG. 4.

With reference to FIGS. 4-5 there is illustrated an end-user fillable fluid cartridge 30 having a cartridge body 32 and one or more empty chambers 34*a*, 34*b* therein. The chambers 34*a*, 34*b* are isolated from one another by a dividing wall 36. Each of the chambers 34*a* and 34*b* is devoid of a backpressure device. Fluid slots 38*a* and 38*b* are provided in each of the chambers 34*a* and 34*b* to provide flow of fluid from the chambers 34*a* and 34*b* to the ejector arrays 20*a* and 20*b* attached adjacent to the fluid slots 38*a* and 38*b*. The ejector arrays 20*a* and 20*b* are contained in a fluid ejection head chip 40 attached to the cartridge body 32 by means of an adhesive and a flexible circuit tape 42.

Figure 7:
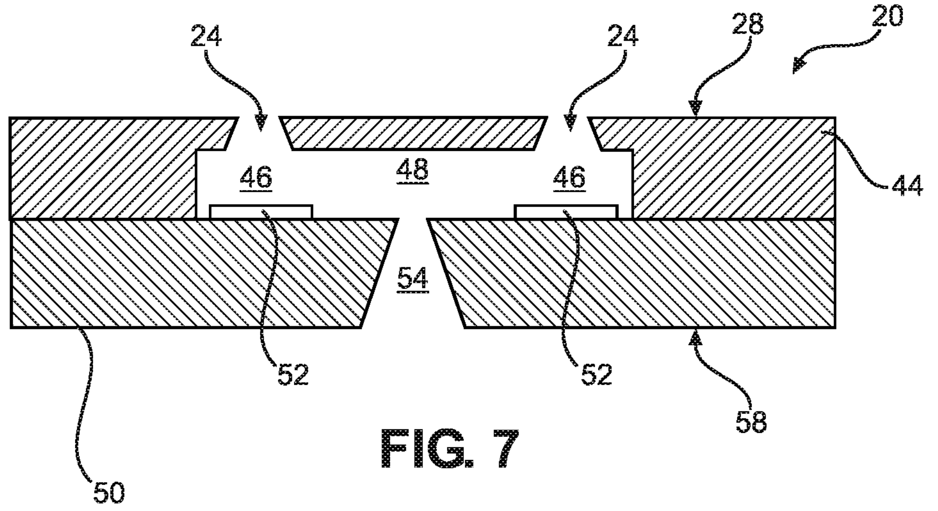
FIG. 7 is a cross-sectional view, not to scale, of a portion of a fluid ejection head chip showing fluid flow paths therein.
Figure 8:
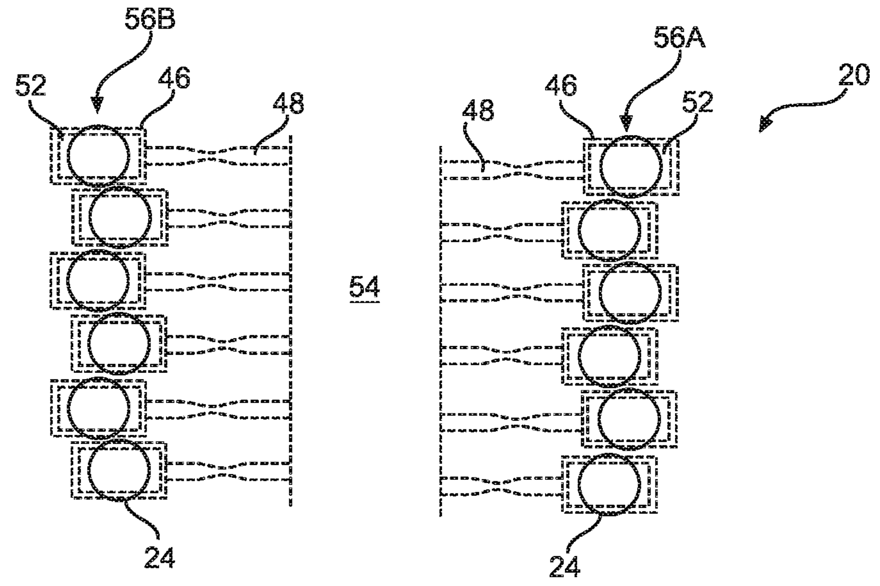
FIG. 8 is a top plan view, not to scale, of the fluid ejection head chip of FIG. 7.

FIGS. 7 and 8 provide details of the fluid ejector array 20. A nozzle plate 44 containing nozzle holes 24 and fluid ejection chambers 46 is attached to a semiconductor substrate 50 having fluid ejectors 52 thereon. For simplicity, a portion of an ejector array illustrating a single fluid ejector 52 and corresponding ejection nozzle hole 24 is shown. However, a single fluid ejection head chip 40 may include one or more ejector arrays 20. Likewise, one or more fluid ejection head chips 40 may be attached to the cartridge body 32. Ejector arrays 20 typically contain one or more fluid ejectors 52 and corresponding ejection nozzles 24. Fluid is provided to each ejector array 20*a* and 20*b* from the fluid slots 38*a* and 38*b* in the chambers 34*a* and 34*b* of the fluid cartridge 30 through a fluid supply via 54 etched through the semiconductor substrate 50. As shown in FIG. 8, the fluid supply via 54 may provide fluid to one or more fluid ejector arrays 56*a* and 56*b*.

For the purposes of the disclosure, the term "open-top" refers primarily to a lack of a backpressure device found in standard fluid cartridges and does not necessitate the lack of a cover or lid on the fluid cartridge. However, the fluid cartridge 30 has one or more chambers 34 therein for filling by a user to provide fluid to the fluid ejection head chip 40. In order to prime the fluid ejection head chip 40 with fluid, a mechanical shock, heat, and/or rapid acceleration of the fluid cartridge 30 is provided to disturb the fluid, thereby promoting capillary action of the fluid from the fluid chambers 46 to the nozzles 24 of the nozzle plate 44 thereby establishing a fluidic connection throughout the ejection head chip 40 and the fluid in the cartridge body 32. The term "impact" as used herein refers to a high force or shock applied to the cartridge body 32 over a short period of time.

The ejection head chip 40 is a micro electromechanical system that contains one or more fluid paths from the backside 58 of the chip 40 to the front side of the chip 40 and one or more arrays 20 of fluid ejectors 52 that are activated to eject fluid from the external face 28 of the chip and onto a substrate. The backside 58 of the ejector head chip 40 is sealed against a bottom wall of the cartridge body 32 and is in fluidic connection fluid in the chamber(s) 34 of the cartridge body 32.

Figure 1:
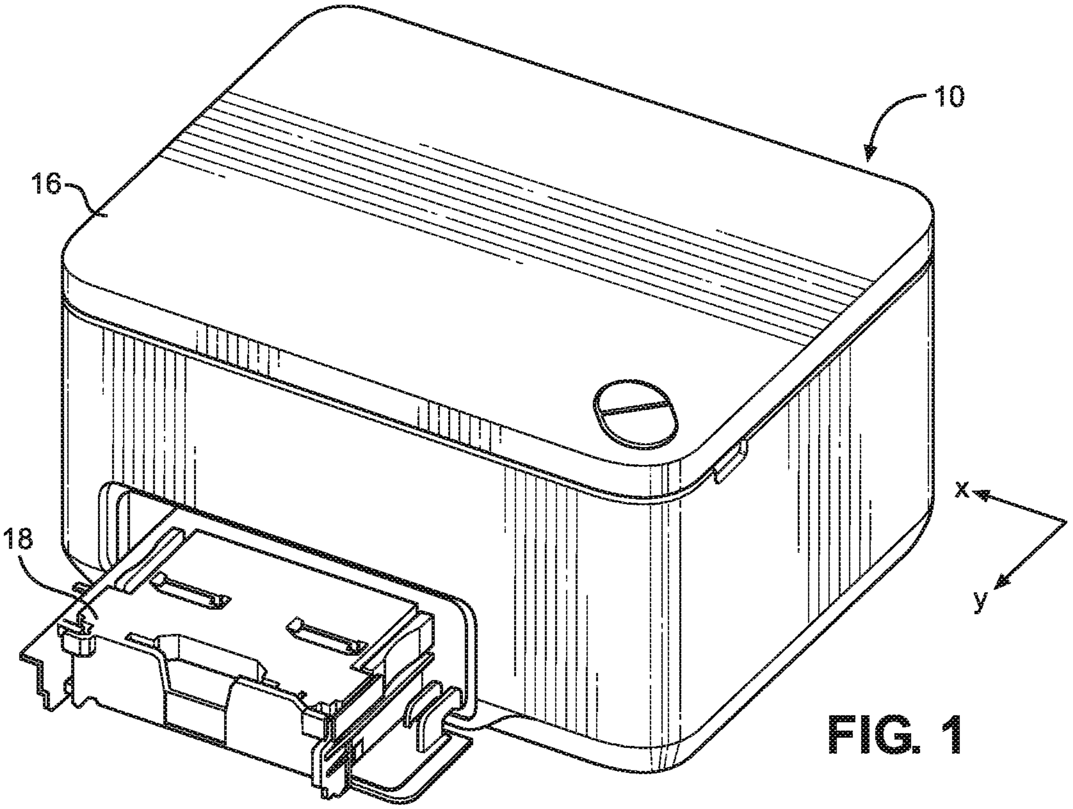
FIG. 1 is a perspective view of a fluid dispense device for use with priming mechanisms described according to the disclosure.
Figure 2:
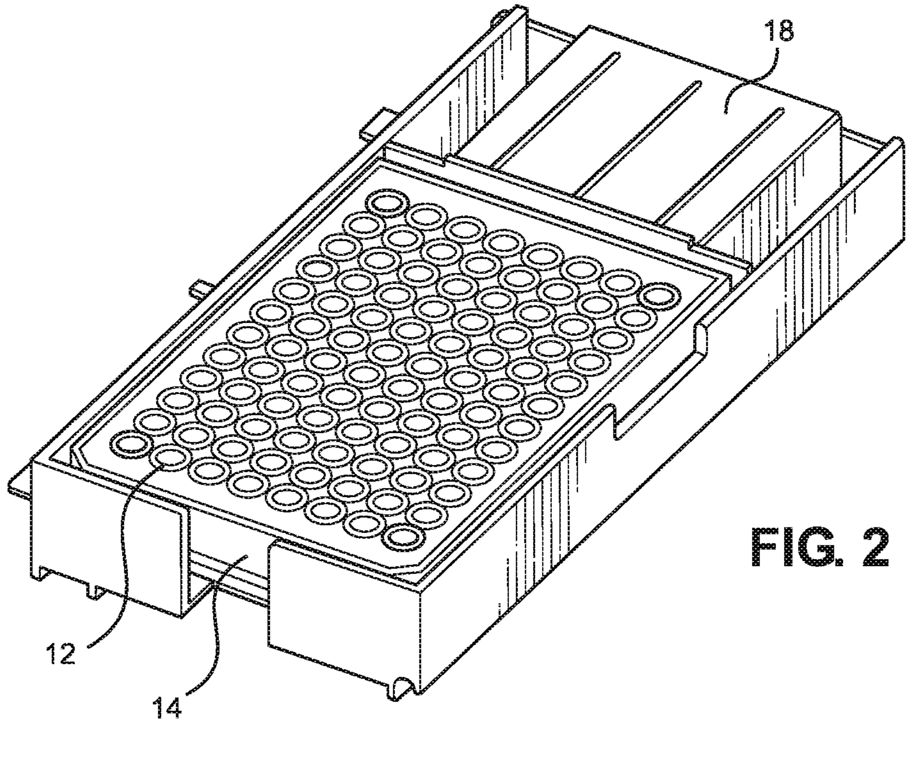
FIG. 2 is a perspective view of a micro-well plate in a tray for use with the fluid dispense device of FIG. 1.
Figure 3:
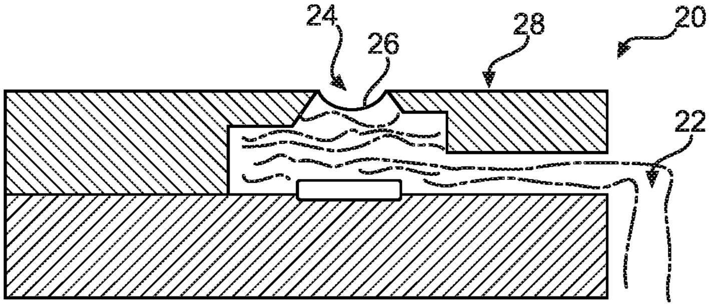
FIG. 3 is a cross-sectional view, not to scale, of a portion of a primed fluid ejector array for a fluid cartridge containing a backpressure device.
Figure 9:
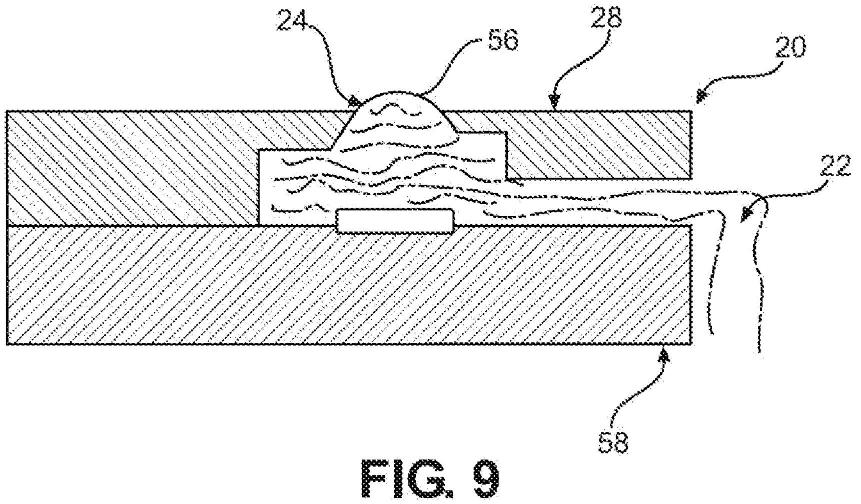
FIG. 9 is a cross-sectional view, not to scale, of a portion of a fluid ejection head chip containing fluid for a fluid cartridge devoid of a backpressure device.

As described above with reference to FIG. 3, the backpressure device in a standard fluid cartridge causes a slight concavity of the meniscus 26 of the fluid at the fluid/air interface. Due to the concavity of the meniscus 26, an impact applied to the fluid cartridge may cause the meniscus 26 to collapse and ingest air into the ejector array 20. Such air bubbles pose a significant issue for reliable jetting of fluid from the ejector array 20. However, in open-top fluid cartridges 30, that do not contain a backpressure device, the meniscus 56 of the fluid 22 at fluid/air interface is convex as shown in FIG. 9. The convexity of the meniscus 56 helps prevent ingestion of air as the impact to the fluid cartridge body 30 takes place when priming any arrays in the fluid ejection head chip 40.

Figure 10:
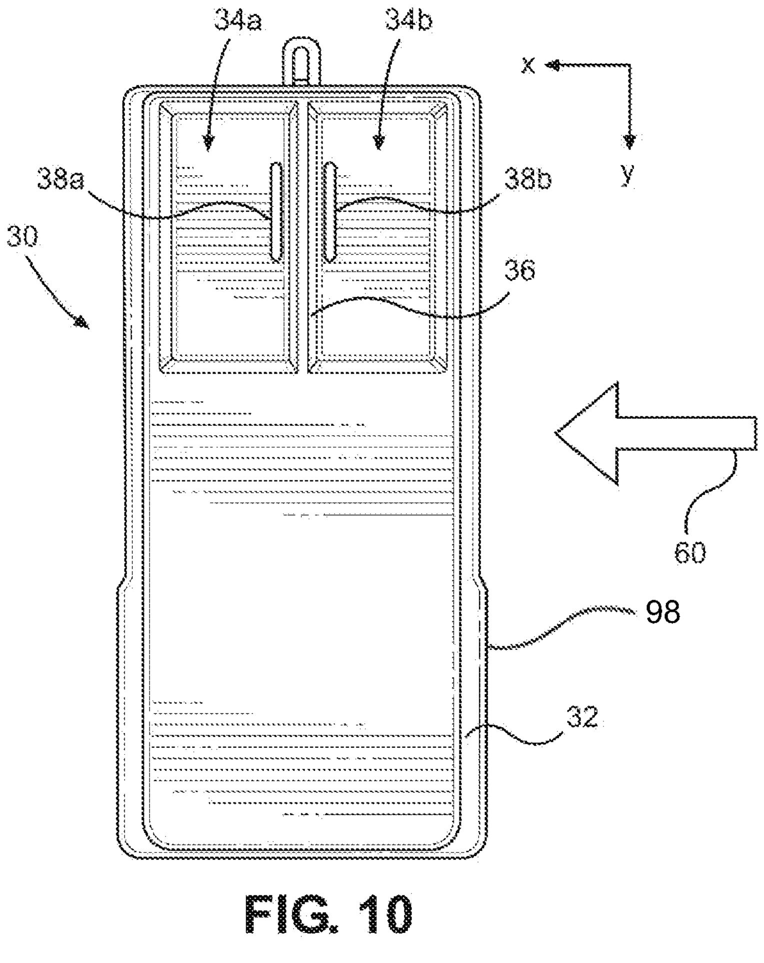
FIG. 10 is a top plan view of the open-top fluid cartridge of FIG. 4 showing a direction of impact for priming the fluid cartridge.

Although spontaneous priming of the ejection head chip 40 is ideal, the surface tension of many fluids may be too great to allow for the initiation of capillary motion from the backside 58 of the ejector array 20 to the front side of the external face 28 of the ejector array 20. Accordingly, an impact to the cartridge body 32 as shown by arrow 60 (FIG. 10) or a rapid acceleration of the fluid cartridge in a direction perpendicular to a plane defined by the external face 28 of the ejector array 20 may provide a disturbance necessary to cause the fluid 22 to transition to the next part of the fluid path without the need for increasing the pressure head of the fluid, thereby allowing for reliable priming of smaller volumes of fluids. Other fluid properties that may impact the capillary action of the fluid through the ejector array 20 include, but are not limited to, viscosity, polarity, and density. The magnitude and frequency of the impact may need to be adjusted for different fluids.

Figure 11:
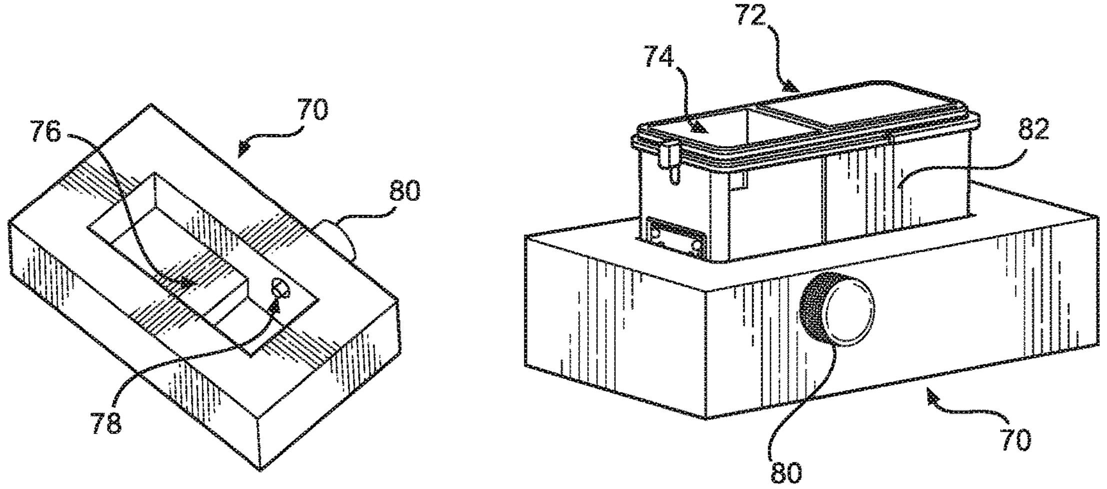
FIG. 11 is a perspective view of a stand-alone priming device according to a first embodiment of the disclosure.

FIG. 11 illustrates a manual priming device 70 that may be used to provide an impact to an open-top fluid cartridge 72 containing a single chamber 74. The device 70 includes a cartridge mounting area 76, a spring biased plunger 78 and a plunger knob 80. Once the fluid cartridge is positioned in the cartridge mounting area 76, a user may pull and release the plunger knob 80 to provide a sharp impact to the cartridge body 82. One or more impacts to the cartridge body 82 by the plunger 78 may be required to adequately prime the fluid ejection head chip attached to the cartridge body 82. While a mechanical plunger 78 is illustrated in FIG. 11, it will be appreciated that a pneumatic, hydraulic or electro-mechanical actuator may also be used. Likewise, the plunger knob 80 may be rotated to provide a spring-loaded rotational impact to the cartridge body 82.

Figure 12:
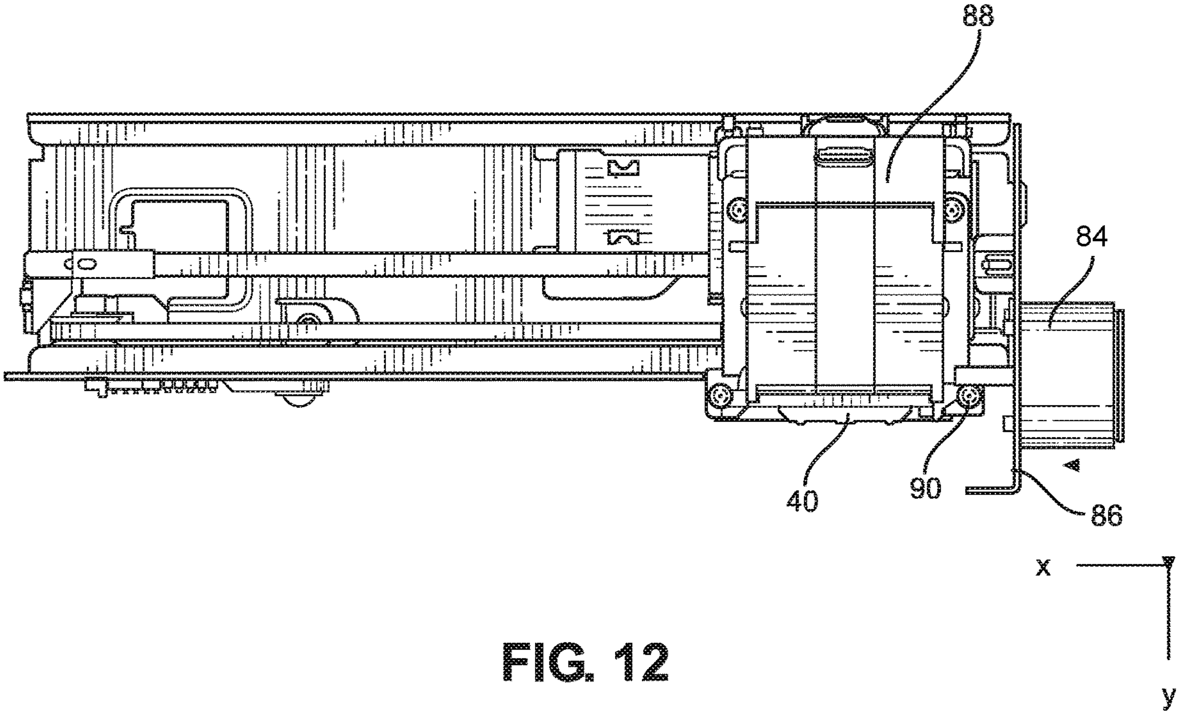
FIG. 12 is an elevational front view of a cartridge carriage and fluid dispense device frame containing a priming device according to a second embodiment of the disclosure.
Figure 13:
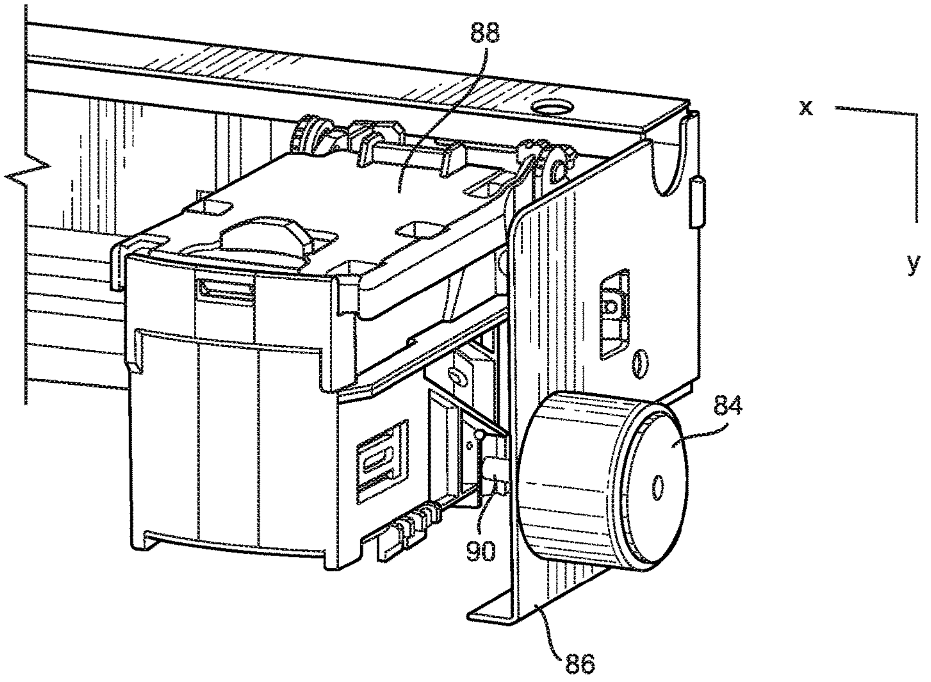
FIG. 13 is a perspective view of the cartridge carriage and priming device on the frame of the fluid dispense device of FIG. 12.
Figure 14:
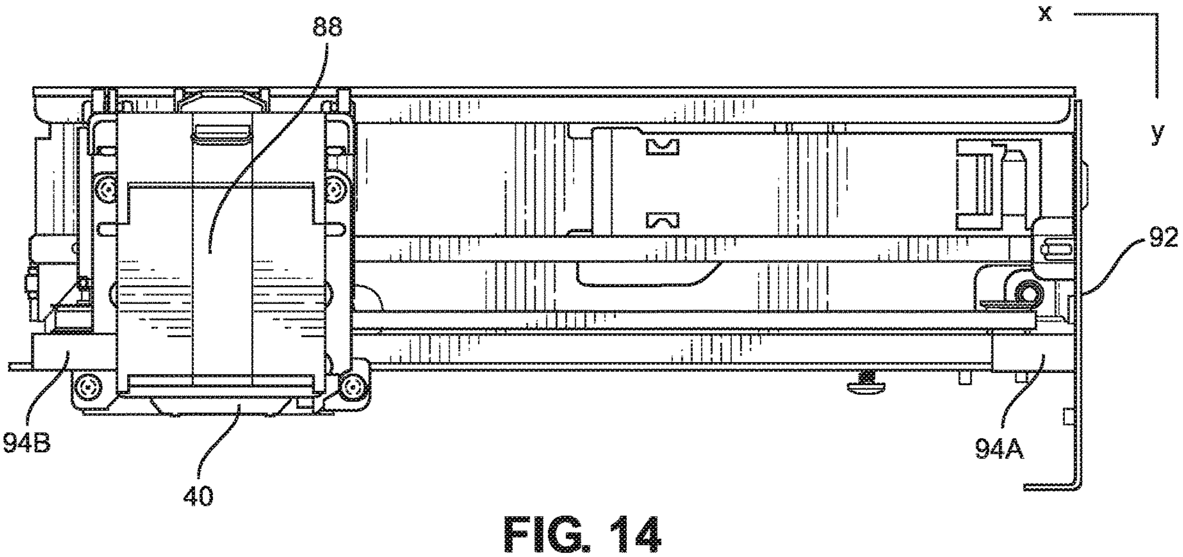
FIG. 14 is an elevational front view of a cartridge carriage and fluid dispense device frame containing a priming device according to a third embodiment of the disclosure.

In some embodiments, the mechanical or otherwise actuated plunger 78 may be incorporated in the fluid ejection device 10. FIGS. 12-14 illustrate the use of a linear solenoid activated plunger 84 that is mounted to a frame 86 of a fluid ejection device. The fluid cartridge is mounted into a carriage 88 for moving the fluid cartridge and ejection head chip 40 in an x direction back and forth over a substrate as fluid is dispensed from the fluid cartridge. After filling the fluid cartridge, the carriage 88 is positioned adjacent to the linear activated solenoid for activating the plunger 90 so that the plunger 90 impacts a side of the carriage 88 to prime the fluid cartridge. FIG. 12 is a front, elevational view, of the frame 86, carriage 88, and linear solenoid plunger 84. FIG. 13 is a top perspective view of the linear solenoid plunger 84, frame 86, and carriage 88 of FIG. 12.

Figure 15:
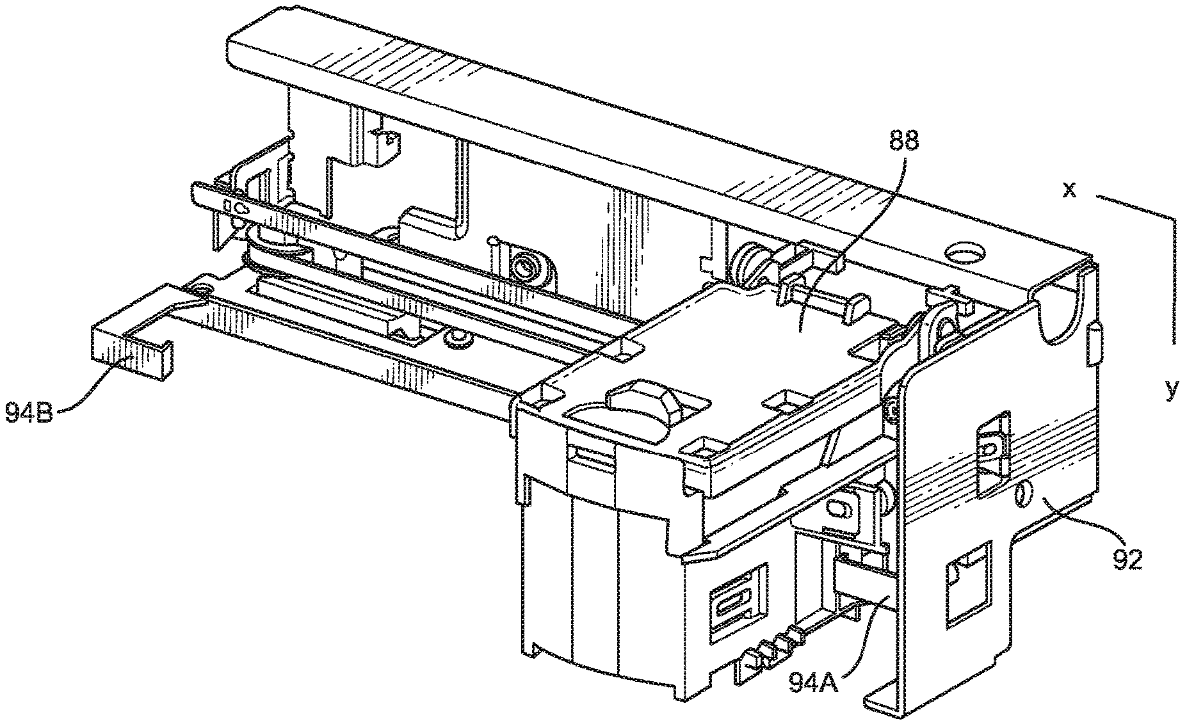
FIG. 15 is a perspective view of the cartridge carriage and priming device on the frame of the fluid dispense device of FIG. 14.

Another embodiment of the disclosure is illustrated in FIGS. 14-15. In this embodiment, rather than using a dedicated impactor 84, the frame 92 of the fluid ejection device contains one or more fixed impact devices 94A and 94B for impacting the side of the cartridge 30 as the carriage 88 moves from one side of the frame 92 (FIG. 14) to the other side of the frame 92 (FIG. 15). According to the embodiment, the carriage 88 of the device 10 is driven by a motor which may be programmed to move the carriage 88 to a specified position to impact the cartridge 30 on impact device 94A or 94B at a specified speed. Accordingly, the impact position for the cartridge 30 may be slightly outside of a typical operating range which causes the carriage 88 to impact the fixed impact devices 94A and 94B on the frame 92. The collision of the carriage 88 with the impact devices 94A and 94B provides energy sufficient to initiate priming of the ejection head chip 40. Since the motion of the carriage 88 is programmable, any sequence of speed and position may be used to ensure priming of the ejection head chip 40.

While the foregoing embodiments illustrate fixed impact points for the carriage 88 relative to the frame 86 and 92 of the device 10, an adjustable impact device may be used to adjust the location where the carriage 88 is impacted. While the impact device may be adjustable in the y direction parallel to a plane defined by a side of the carriage 88, the impact device may also be adjustable in the direction of motion of the carriage 88 along the x direction which is perpendicular to the plane defined by the side of the carriage 88.

In other embodiments, instead of the impact device being rigidly mounted, the impact device may be hung from an axle to act as a pendulum that repeatedly swings and taps a side of the carriage 88 until all energy of the pendulum is dissipated. Counterweights or damping materials may be used to modify the energy of the impact on the carriage 88.

Figure 6:
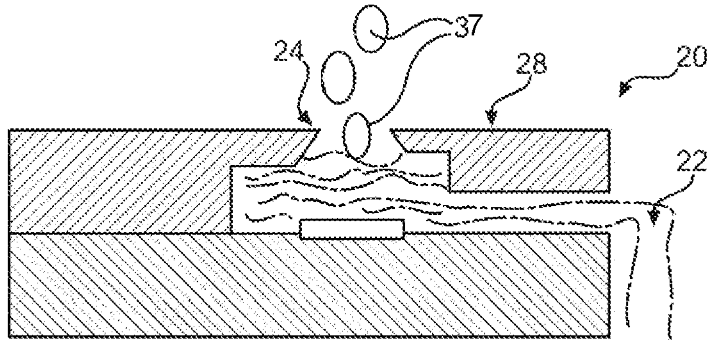
FIG. 6 is a cross-sectional view, not to scale, of a portion of a fluid ejection head chip containing fluid subsequent to priming, in the process of ejecting fluid.

In yet another embodiment, the empty chamber(s) 34 may be filled and the cartridge 30 rapidly accelerated in a direction perpendicular to a plane defined by the external face 28 of the ejector array 20 (FIG. 6). Without desiring to be bound by theoretical considerations, it is believed that an inertia of the fluid may resist the change in motion and provides enough pressure against a backside 58 of the ejector array 20 (FIG. 7) to initiate capillary wicking action of fluid through the fluid supply via 54 and into the fluid supply channel 48 and fluid ejection chambers 46. In a similar manner, a cartridge 30 containing fluid could be placed in a centrifugal-type device with the ejector array 20 facing radially outward. Thus, the inertial resistance of the fluid now coupled with the centrifugal force from the centrifugal-type device may be sufficient to prime the ejector array 20. In still another embodiment, ultrasonic vibrations may be used to induce priming of the ejector array 20 and promote fluid flow to fluid ejection chambers 46.

In some embodiments, priming may be achieved by shaking the cartridge 30. Often when an open-topped cartridge 30 (FIGS. 4-5) is filled with a pipette, some fluid adheres to the walls of the empty chambers **34*a* and 34*b* and are not recoverable for ejection by the ejector array 20. Rapidly moving the cartridge 30 back and forth in the x direction, with a high frequency and small amplitude, can help dislodge fluid from the side walls of the chambers 34*a* and 34*b* and cause fluid to flow into the fluid slots 38*a* and 38*b* where it can then flow to the ejector array 20. A series of shaking and then impact, as described above, may produce the optimal conditions for ensuring priming of the ejector array 20 when filling the chambers 34*a* and 34*b* of the cartridge 30** with small volumes of fluid.

Additionally, since the ejector array 20 is typically not centered with respect to the chambers **34*a* and 34*b*, the direction of impact may affect the priming process. For example, if the fluid slot 38*a* feeding the ejector array 20 is offset to the right side of the chamber 34*a*, tapping the right sidewall 98 of the cartridge body 32 (FIG. 10**) may improve the priming process.

The following non-limiting examples illustrate an impact process for priming an ejector array 20.

Example 1

Using an open-top four-chamber cartridge required a fluid pressure head of about 28.5 millimeters to induce spontaneous priming of all nozzles 24 of an ejector array 20. Using the same fluid, a fluid pressure head of only 0.5 millimeters consistently primed all nozzles 24 with the use of the impact apparatus of FIG. 11. Using a desktop printer, a sequence of carriage movement overdrive commands was able to reliably prime an ejector array 20 with a 50-microliter sample of ink in the fluid cartridge, equivalent to a fluid pressure head of 2.5 millimeters.

Example 2

Phosphate buffered saline (PBS) is a common reagent used in biochemical assays. Two solutions, with or without a sorbitan monolaurate non-ionic surfactant, underwent testing. Spontaneous priming of an ejection head chip with either solution was undeterminable, both requiring a fluid pressure head greater than the maximum testing fluid height of 43 millimeters. Using the impact apparatus of FIG. 11, the PBS without the surfactant was able to reliably prime the ejection head chip with 2.3 millimeters of fluid pressure head while PBS with added 0.04% surfactant was able to reliably prime the ejection head chip with 2.0 millimeters of fluid pressure head. A carriage impact sequence was determined which could reliably prime the ejection head chip with the PBS and surfactant solution at a fluid pressure head of 3.4 millimeters.

In other embodiments, pre-heating the fluid using a heater positioned on the ejection head chip 40 may be sufficient to induce flow of fluid from the cartridge 30 into the ejector array 20.

Example 3

Priming sequences have been determined which can reliably prime 30 microliters of phosphate buffered saline (PBS)—in the open-top fluid cartridge 30. In this test, 30 microliters of fluid provided approximately 2.6 millimeters of fluid pressure head. The fluid was heated to 45° C. for 20 seconds using the ejection head chip heater on the ejector array 20, and then the carriage 88 was tapped against the frame 92 of the device 10 two times at a speed of about 51 cm per second. The temperature, duration, and impact parameters are fluid dependent. It was found that either heating the fluid or tapping the frame was enough to prime most nozzles of the ejection head chip. Even greater success was found with both heating the fluid and tapping the frame which consistently primed all nozzles of the ejection head chip. Using a lower preheat temperature required a longer heating period for a given fluid.

In accordance with the disclosed embodiments, a priming sequence is defined as a series of steps that are used to ensure that a cartridge containing a specific fluid is ready to be dispensed through all nozzles of ejector array 20. Once the cartridge is placed in the carriage of a device, the priming sequence may include one or more of the following steps:

1) Tapping the carriage against the frame of the device to impart an impulse to the ejection head chip.
2) Repeating step (1) multiple times, with or without pauses in between.
3) Impacting the carriage against the frame of the fluid ejection device at various speeds.
4) Warming the fluid by using the ejection head chip heater on the ejection head chip. Modifying the temperature and duration of heating for a specific fluid or application.
6) Ejecting fluid from the ejection head chip.

Accordingly, a priming sequence for a particular fluid may include of one or more of the foregoing steps in any sequence. In some cases, it may be determined that some of the steps are not required. For more difficult to prime fluids, it may be determined that some of these steps need to be repeated more than once.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A priming device for a fluid cartridge comprising an impact mechanism configured to impact an external side of the fluid cartridge, wherein the fluid cartridge is devoid of a backpressure device and has a fluid reservoir and an ejection head chip in fluid flow communication with the fluid reservoir.

2. The priming device of claim 1, wherein the fluid cartridge is an open-top fluid cartridge.

3. The priming device of claim 1, wherein the impact mechanism is a manually operated impact mechanism.

4. The priming device of claim 1, wherein the impact mechanism is an automated impact mechanism.

5. The priming device of claim 4, wherein the impact mechanism comprises an impact rod of a linear solenoid.

6. The priming device of claim 1, wherein the impact mechanism comprises an impact head attached to a frame member of a fluid dispense device.

7. The priming device of claim 1, wherein the impact mechanism comprises a spring biased plunger attached to a fluid cartridge holder.

8. The priming device of claim 1, further comprising an ejection head chip heater.

9. The priming device of claim 8, wherein the ejection head chip heater is disposed on the ejection head chip.

10. A fluid dispense device comprising:

a fluid cartridge devoid of a backpressure device, wherein the fluid cartridge has a fluid reservoir and an ejection head chip in fluid flow communication with the fluid reservoir;

a fluid cartridge translation mechanism for moving the fluid cartridge in a first direction across a substrate; and an impact head attached to a frame member of the fluid dispense device configured for priming the fluid cartridge, wherein the impact head is configured to impact an external side of the fluid cartridge.

11. The fluid dispense device of claim 10, wherein the impact head comprises an impact rod of a linear solenoid.

12. The fluid dispense device of claim 10, wherein the impact head comprises a spring biased plunger.

13. A method for priming a fluid cartridge comprising:

providing a fluid cartridge devoid of a backpressure device, wherein the fluid cartridge has a fluid reservoir and an ejection head chip in fluid flow communication with the fluid reservoir; and impacting an external side wall of the fluid cartridge with an impact mechanism.

14. The method of claim 13, further comprising heating the ejection head chip.

15. The method of claim 13, wherein the impact mechanism is attached to a frame of a fluid dispense device containing the fluid cartridge.

16. The method of claim 13, wherein the impact mechanism comprises a cartridge holder having a spring biased plunger for impacting the external side wall of the fluid cartridge.

17. The method of claim 13, wherein the impact mechanism comprises a linear solenoid and an impact rod.

* * * * *